US012585378B2

(12) United States Patent
  Cho

(10) Patent No.: US 12,585,378 B2
(45) Date of Patent: Mar. 24, 2026

(54) METHOD FOR DESIGNING MACHINE LEARNING MODEL USING A 3D USER INTERFACE AND SYSTEM USING SAME

(71) Applicant: Light & Math Inc., Jecheon-si (KR)

(72) Inventor: Sunggoo Cho, Jecheon-si (KR)

( * ) Notice: Subject to any disclaimer, the term of this patent is extended or adjusted under 35 U.S.C. 154(b) by 191 days.

(21) Appl. No.: 18/603,414

(22) Filed: Mar. 13, 2024

(65) Prior Publication Data

US 2024/0310987 A1 Sep. 19, 2024

(30) Foreign Application Priority Data

Mar. 13, 2023 (KR) ........................ 10-2023-0032830

(51) Int. Cl.
  *G06F 3/0482* (2013.01)
  *G06F 3/04845* (2022.01)
(52) U.S. Cl.
  CPC ........ *G06F 3/04845* (2013.01); *G06F 3/0482* (2013.01)
(58) Field of Classification Search
  CPC .................................................. G06F 3/048–05
  See application file for complete search history.

(56) References Cited

U.S. PATENT DOCUMENTS

| | | | | |
|---|---|---|---|---|
| 8,903,746 B2 * | 12/2014 | Kudritskiy | .............. | G06N 3/04 706/11 |
| 9,753,959 B2 * | 9/2017 | Birdwell | ................ | G06N 3/063 |
| 11,086,471 B2 * | 8/2021 | Pascale | ................... | G06F 16/34 |
| 11,281,975 B1 * | 3/2022 | Isaksson | ............... | G06F 3/0486 |

| | | | | |
|---|---|---|---|---|
| 11,853,401 B1 * | 12/2023 | Nookula | ............. | G06F 18/2163 |
| 2006/0224533 A1 * | 10/2006 | Thaler | ...................... | G06N 3/04 706/15 |
| 2014/0253556 A1 * | 9/2014 | Riche | ...................... | H04L 41/22 345/440 |
| 2015/0106306 A1 * | 4/2015 | Birdwell | ................ | G06N 3/063 706/11 |
| 2017/0351401 A1 * | 12/2017 | Pascale | .................. | G06N 20/00 |

(Continued)

FOREIGN PATENT DOCUMENTS

| | | |
|---|---|---|
| KR | 10-2022-0121680 | 9/2022 |
| KR | 10-2022-0127376 | 9/2022 |

OTHER PUBLICATIONS

English Specification of 10-2022-0121680.
English Specification of 10-2022-0127376.

*Primary Examiner* — Daniel Rodriguez
(74) *Attorney, Agent, or Firm* — ANTONIO HA & U.S. PATENT, LLC

(57) ABSTRACT

A method for designing machine learning model comprises inputting, by a layer input unit, a type of layer and parameters of the layer using a layer input panel including a layer type determination panel and a layer parameter input panel, receiving, by a layer model management unit, the type and parameters of the layer selected in the layer input step, constructing a layer model using the input layers and displaying the configuration of the layer model on the layer state display panel of the layer state panel, parsing, by a layer model process unit, the layer model displayed on the layer state display panel of the layer state panel to calculate a layer position and node position for visualization in a layer model visualization unit, and visualizing, by the layer model visualization unit, the layer model calculated in the layer model process step in 3D.

12 Claims, 14 Drawing Sheets

(56)                    References Cited

U.S. PATENT DOCUMENTS

| | | | |
|---|---|---|---|
| 2020/0380365 A1 | 12/2020 | Karino | |
| 2021/0055915 A1 | 2/2021 | Guo et al. | |
| 2023/0019194 A1* | 1/2023 | Rathi | G06N 3/04 |
| 2023/0025677 A1* | 1/2023 | Sallee | G06F 3/0484 |
| 2023/0028240 A1* | 1/2023 | Choi | G06F 3/04845 |
| 2024/0053877 A1* | 2/2024 | Du | G06F 3/0486 |
| 2025/0165067 A1* | 5/2025 | Zhao | G16H 50/30 |

* cited by examiner

METHOD FOR DESIGNING MACHINE LEARNING MODEL USING A 3D USER INTERFACE AND SYSTEM USING SAME

CROSS-REFERENCE TO RELATED APPLICATION(S)

This application claims priority to Korean Patent Application No. 10-2023-0032830 filed in the Korean Intellectual Property Office on Mar. 13, 2023, the disclosure of which is incorporated by reference herein in its entirety.

TECHNICAL FIELD

The present disclosure relates to a method for designing a machine learning model using a 3D user interface and a system using the same. More specifically, it relates to a method for designing a machine learning model using a 3D user interface that visually expresses the layer model and a system using the same.

DISCUSSION OF RELATED ART

Machine learning is a field of computer science that involves developing algorithms that can learn from data and make predictions or decisions based on that data. The process of coding these algorithms may be complex and requires a good understanding of programming concepts and mathematical concepts such as linear algebra and calculus.

For example, building a simple machine learning model to predict house prices based on the following description may be considered: Building models with various features such as number of bedrooms, square footage, and location requires a solid understanding of a programming language such as Python and a good understanding of a machine learning framework such as TensorFlow or PyTorch. Additionally, to build a robust model, the concepts of regression analysis, overfitting, and cross-validation must be understood.

However, for many people with limited skills, the difficulty of coding machine learning models can be a barrier. There is a need to develop a user-friendly interface that allows users to build, train, and apply machine learning models without writing code, making the interface accessible to more users even without a background in computer science or programming.

SUMMARY

The present disclosure is created to address the conventional issues, and the purpose of the present disclosure is to provide a method for designing a machine learning model using a 3D user interface and a system using the same.

Furthermore, the purpose of the present disclosure is to increase the stability of the system by adding a verification system to prevent errors.

A method for designing machine learning model using a 3D user interface according to the present disclosure comprises layer input step S100 of inputting, by a layer input unit 110, a type of layer and parameters of the layer using a layer input panel 210 including a layer type determination panel 211 and a layer parameter input panel 212, layer model configuration step S200 of receiving, by a layer model management unit 120, the type and parameters of the layer selected in the layer input step S100, constructing a layer model using the input layers and displaying the configuration of the layer model on the layer state display panel 221 of the layer state panel 220, layer model process step S300 of parsing, by a layer model process unit 130, the layer model displayed on the layer state display panel 221 of the layer state panel 220 to calculate a layer position and node position for visualization in a layer model visualization unit, and layer model 3D visualization step S400 of visualizing, by the layer model visualization unit 140, the layer model calculated in the layer model process step S300 in 3D.

In an example, the layer input step S100 further comprises a layer input filtering step S150 of examining whether input values are invalid for the parameters according to the types of the input layers.

In an example, the layer model configuration step S200 further comprises a layer error verification step S250 of verifying errors that may occur in the context of each layer for the type and parameters of the input layers.

In an example, in the layer input filtering step S150 of the layer input step S100, when inputting the parameters of the layer in the layer parameter input panel 212 for the type of layer selected in the layer type determination panel 211, a layer parameter input window 212c with the valid range set is displayed according to the type of the layer, and if the value entered in the layer parameter input window 212c is outside the valid range, it is automatically corrected.

In an example, wherein in the layer input filtering step S150 of the layer input step S100, when inputting the parameter of the layer in the layer parameter input panel 212 for the type of layer selected in the layer type determination panel 211, if the layer is a reshape layer or add-skip connection (AddSC) layer, recommended parameters are automatically displayed for selection.

In an example, in the layer input step S100, when the input layer is an add-skip connection (AddSC) layer, parameters of the add-skip connection layer consist of skip connection identification information and skip connection layers, and the skip connection layers are added between two layers having the skip connection identification information.

In an example, wherein the layer type determination panel 211 allows selection of an input data layer, an activation layer, a batch normalization layer, a convolution layer, a dense layer, a padding layer, a pooling layer, and a reshaping layer.

In an example, the layer type determination panel 211 allows selection of an add-skip connection layer.

In an example, the method further comprises layer model modification step S500 of modifying the layer model, and the layer state panel 220 comprises a layer state control button 222 including an add button to add a new layer at the end, a delete button to delete the selected layer, a replace button to replace the selected layer, an insert button to insert the selected layer at a specific location, and a delete all button to delete the layer model visualized in 3D on the layer state display panel 221.

In an example, in the layer model 3D visualization step S400, when defining the shape of the layer as (ny, nz, ch), the layer included in the layer model is represented as ch square units (L) having a height of the ny value and a width of the nz value.

In an example, in the layer model 3D visualization step S400, when the layer model includes two or more layers, the preceding layer is called a previous layer, and the subsequent layer is called a present layer, and a relationship line connecting a point corresponding to one current node for the square unit (L) corresponding to the present layer and a point of at least one previous node belonging to the square unit (L) corresponding to the previous layer required to form the one current node is visualized.

In an example, in the layer model 3D visualization step S400, when the one previous node is needed to create the one current node, the relationship line is visualized to include color.

In an example, in the layer model 3D visualization step S400, when the layer model includes two or more layers, the preceding layer is called the previous layer, and the subsequent layer is called the present layer, and when the present layer is a padding layer or a reshape layer, the previous layer and the present layer are visualized on the same plane.

In an example, in the layer model 3D visualization step S400, when the layer model includes an add-skip connection layer, at least one layer representing a parallel layer relationship in the layer model is visualized as a combination of new layers moved in parallel in the direction in which the layer model progresses.

In an example, in the layer model 3D visualization step S400, when one layer in the layer model is selected, nodes included in the layer are visualized.

A system for designing machine learning model using a 3D user interface comprises a layer input unit 110 configured to input a type of layer and a parameter of the layer using a layer input panel 210 including a layer type determination panel 211 and a layer parameter input panel 212, a layer model management unit 120 configured to receive the type and parameters of the layer selected in the layer input unit 110, construct a layer model using the input layers and display the configuration of the layer model on the layer state display panel 221 of the layer state panel 220, a layer model process unit 130 configured to parse the layer model displayed on the layer state display panel 221 of the layer state panel 220 to calculate a layer position and node position for visualization, and a layer model visualization unit 140 configured to visualize the layer model constructed in the layer model management unit 120 in 3D.

In an example, the system further comprises a model error verification unit 125 configured to verify errors when displaying the input layers on the layer state display panel 221 of the layer state panel 220.

Therefore, according to the present disclosure, when designing a layer model, the layer model can be designed in a user-intuitive manner by selecting the type of layer and entering parameters according to the type of the selected layer.

In addition, the validity of parameters according to the characteristics of the input layer can be verified at the input stage of the graphical user interface, so users can prevent errors in layer design without direct coding.

In addition, by applying various types of visualization according to the characteristics of the layer, users can more intuitively understand the characteristics of the applied layer and can easily design the layer model due to the user-friendly editing method.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Figure 1:
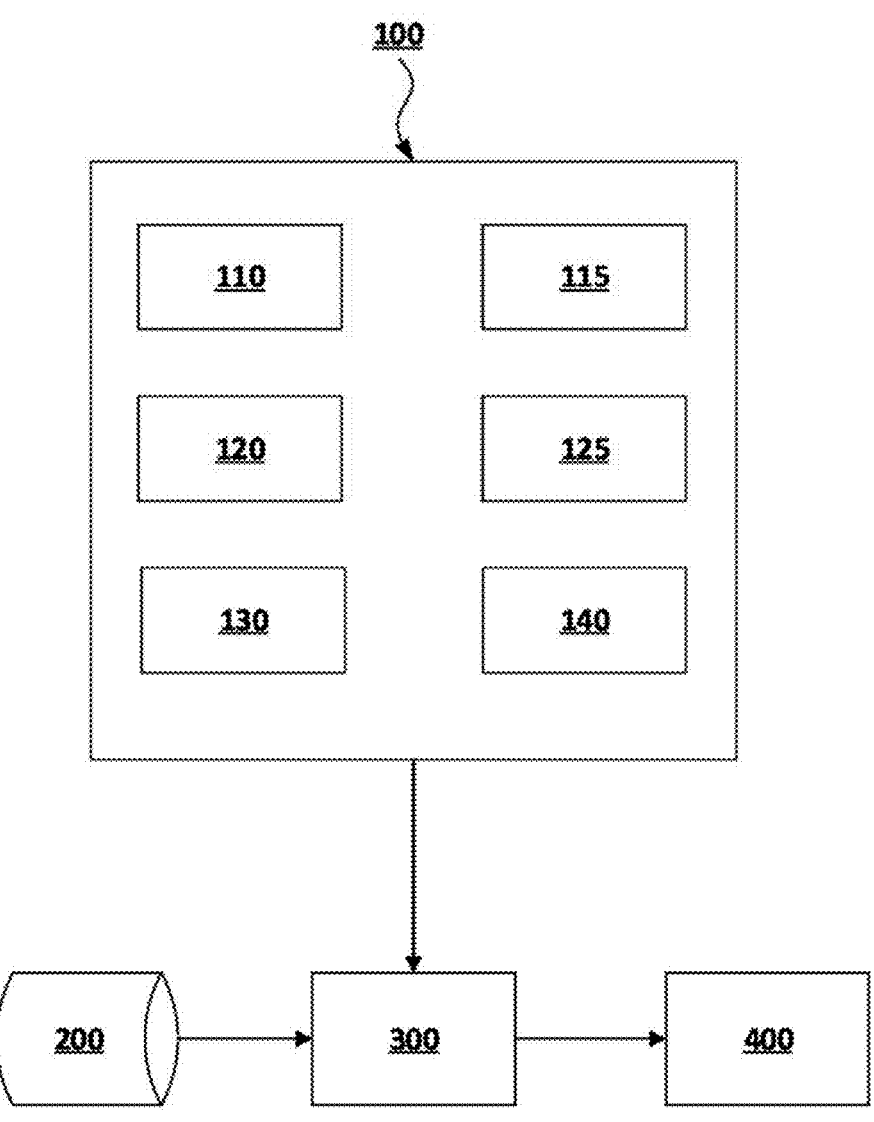
FIG. 1 is a configuration diagram illustrating a system for designing the machine learning model to which a method for designing the machine learning model using a 3D user interface according to the present disclosure is applied.

Hereinafter, preferred embodiments are described with reference to the attached drawings. Here, the thickness of lines or sizes of components shown in the drawings may be exaggerated for clarity and convenience of explanation. In addition, the terms described below are terms defined in consideration of functions in the present disclosure and may vary depending on the intention or custom of the user or operator. Therefore, definitions of these terms should be made based on the content throughout this specification.

In addition, the following embodiments do not limit the scope of the present disclosure, but are provided merely as examples, and there may be various embodiments implemented through the technical idea of the present disclosure. Explanation of Terms The definitions of terms defined below are intended to directly specify what the applicant wishes to understand when describing the technology in the present disclosure. The applicant has used the corresponding terms to describe the invention as understood from the explanation of terms below, and even if terms used in the technology industry are missing or used differently, they should be interpreted in priority over the description of the technology intended by the applicant. Further, if there is an error in the interpretation of a term based on the consistent use of the term, rather than uniformly applying the terminology within the industry, the meaning applied through consistent use must be interpreted in reverse and translated into the closest term deemed most appropriate, and the term may not be interpreted according to the absolute meaning of the term itself, but may be interpreted relatively by referring to the contents described in the detailed description.

The term machine learning is defined herein as a branch of artificial intelligence that deals with the design and development of algorithms that can learn patterns in data and make predictions or decisions without being explicitly programmed to perform the task at hand. It involves automating the process of finding relationships in data using statistical models and algorithms and using these relationships to make predictions about future events or data points. Machine learning algorithms can be supervised learning, unsupervised learning, semi-supervised learning, or reinforcement learning, and are used to improve the accuracy and performance of the system through experience and data exposure.

A layer is used herein to refer to a component of an artificial neural network that processes input data and produces output. Each layer receives input from the previous layer, processes it through mathematical operations, and passes the results to the next layer. By combining the layers of a neural network, layers can be modeled through complex nonlinear relationships between input and output variables. The layers of a neural network can have a variety of neurons, activation functions, and connection weights, so they can be configured in various ways, and machine learning that meets the desired purpose can be performed depending on the type of configuration. In the present disclosure, a node refers to a neuron and is the basic structural unit of a layer.

Machine learning design, as used herein, refers to the process of creating a model or system that can learn from data. This includes selecting an appropriate algorithm, pre-processing the data, defining the model architecture, evaluating the performance of the model trained on the data, and fine-tuning the model as needed, but especially the process of determining which layers to combine and in what order. As a result, the suitability of predictions or determinations depending on the purpose of machine learning may vary greatly, because designing these layers into an appropriate structure can be an important part of designing machine learning.

In particular, as used herein, these multiple layers are arranged in order, and the result depending on which layer is applied is referred to as a layer model. In particular, this should be understood separately from the machine learning model created as a result of machine learning. A machine learning model refers to the final result generated through learning and has the same meaning as those referred to as machine learning algorithms, prediction models, etc.

Method for Designing Machine Learning Model

Figure 2:
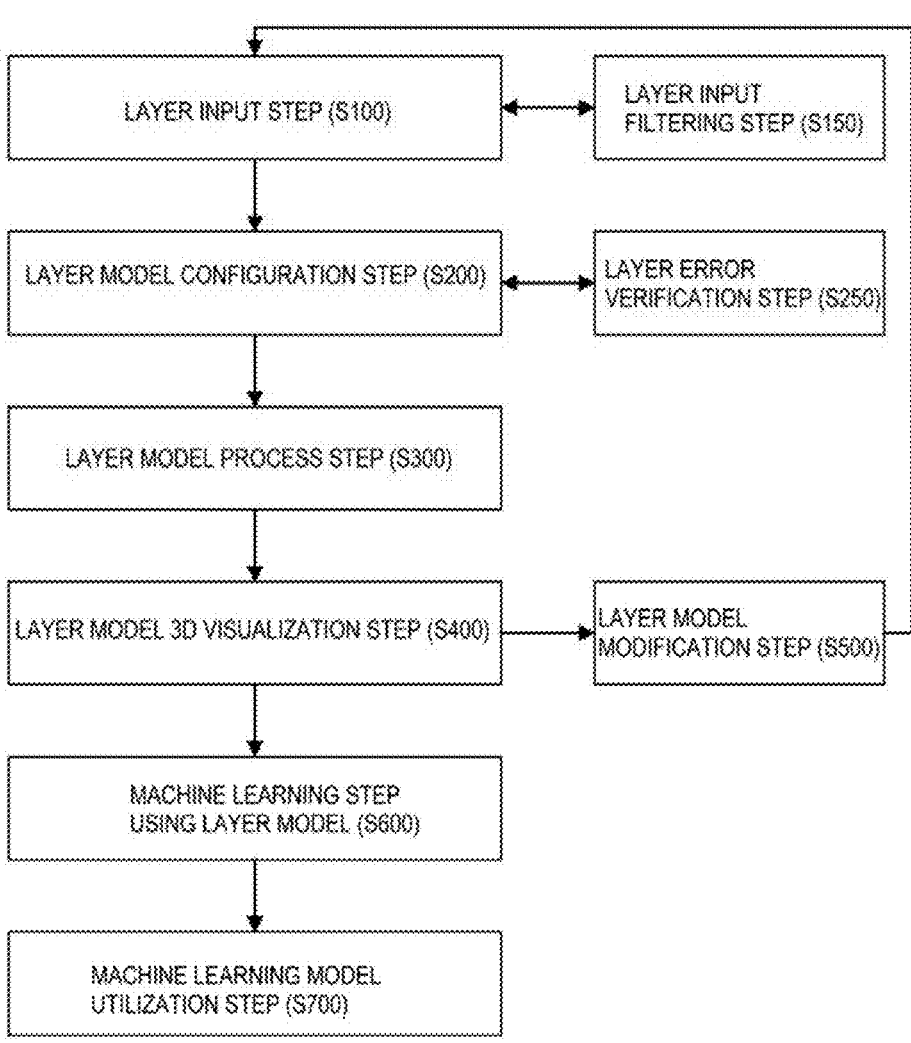
FIG. 2 is a flowchart of a method for designing the machine learning model according to the embodiment of FIG. 1.

FIG. 1 is a configuration view illustrating a system for designing the machine learning model to which a method for designing the machine learning model using a 3D user interface according to the present disclosure is applied. FIG. 2 is a flowchart of a method for designing the machine learning model according to the embodiment of FIG. 1.

Referring to FIG. 1, the system for designing machine learning model 100 according to the present disclosure includes a layer input unit 110, a layer model management unit 120, a layer model process unit 130, and a layer model visualization unit 140. In addition, the system may further include a layer input filtering unit 115 and a layer model error verification unit 125, respectively.

Prior to the detailed explanation to be described later, the function of each component will be briefly described, and the layer input unit 110 serves to select the type of an individual layer and receive input of parameters related thereto. The layer model management unit 120 serves to adjust the order required when constructing an entire layer model using the selected layer as a component, modify individual layers, and add and insert new layers.

Generally, when creating a layer model, next layers are influenced by previous layers. The shape may also change depending on the characteristics of the previous layer. The layer model process unit 130 parses the layer model created through the layer input unit 110 and the layer model management unit 120 to provide attached information such as pad values including the layer shape from the first layer to the last layer to allow the calculation by linking the positions of each layer to be drawn in the layer model visualization unit 140. Errors that may occur in the layer model management unit 120 and the layer model process unit 130 may be checked in advance through the layer input filtering unit 115 and the layer model error checking unit 125.

The layer model created through this system for designing machine learning model 100 is applied to the machine learning module 300 so that machine learning is performed using the provided learning database 200. As a result of this machine learning, a machine learning model 400 is created, which can be used for the intended purpose.

Referring to FIGS. 1 and 2, according to these components, the method for designing machine learning model according to the present embodiment is comprised of a layer input step S100, a layer model configuration step S200, a layer model process step S300, and a layer model 3D visualization step S400.

In addition, in order to prevent or verify errors occurring in each process step, the layer input step S100 may further include a layer input filtering step S150, and the layer model configuration step S200 may further include a layer error verification step S250.

In addition, the method may further include a layer model modification step S500. To distinguish the steps, the layer model modification stage S500 is additionally applied, but this includes repeating the layer input step S100, the layer model configuration step S200, and the layer model process step S300 as necessary.

Meanwhile, when the design of the layer model is completed, a machine learning step S600 of applying it to machine learning can be further performed. As a result, a utilization step S700 of utilizing the machine learning model formed in this way may be further included. In particular, the machine learning step S600 and the utilization step S700 may also be performed in an individual system prepared separately from the main system.

The step-by-step process operated by this system is explained with reference to the operation process along with the graphical user interface.

Graphical User Interface

Figure 3:
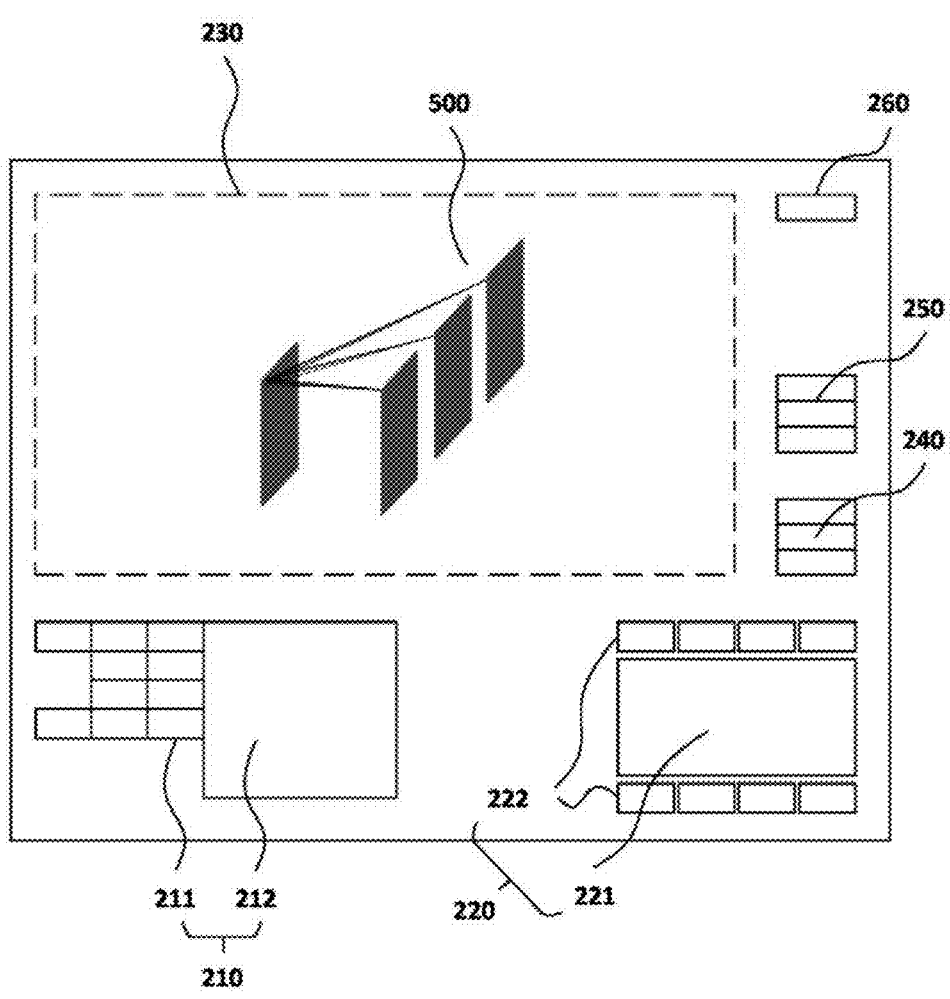
FIG. 3 is a view illustrating a graphical user interface applied to a method for designing the machine learning model according to the embodiment of FIG. 1.

FIG. 3 is a view illustrating a graphical user interface applied to a method for designing the machine learning model according to the embodiment of FIG. 1.

Referring to FIG. 3, the graphical user interface applied to this embodiment includes a layer input panel 210, a layer state panel 220, a layer model visualization panel 230, an open and save button panel 240, and learning and execution button panel 250, and an option button panel 260.

The layer input panel 210 operates in conjunction with the layer input unit 110 and the layer input filtering unit 115, and the layer state panel 220 operates in conjunction with the layer model error checking unit 125 and the layer model management unit 120. The layer model visualization panel 230 operates in conjunction with the layer model visualization unit 140, and in particular, the layer model process unit 130 may operate in conjunction with the operation of the panels 210, 220, and 230.

The open and save button panel 240 includes buttons that operate to open, save, or newly save a saved layer model. The learning and execution button panel 250 includes buttons for setting parameters related to learning in association with learning and execution of machine learning (not shown) or for starting learning and operating the predictive execution of the learned machine learning model. The option button panel 260 includes buttons for setting options.

All layer model design processes are carried out in the user interface shown in FIG. 3 and are related to the operation of the layer input unit 110, the layer model management unit 120, the layer model process unit 130, and the layer model visualization unit 140 to receive necessary information or display information requested by the user through the layer input panel 210, the layer state panel 220, and the layer model visualization panel 230. The layer input unit 110 is used in the layer input step S100, the layer model management unit 120 is used in the layer model configuration step S200, and the layer model process unit 130 and the layer model visualization unit 140 are used in the layer model process step S300 and the layer model visualization step S400, respectively. First, regarding the layer input step S100, the process in which the layer input unit 110 interacts with the interface of the layer input panel 210 is described.

Figure 4A:
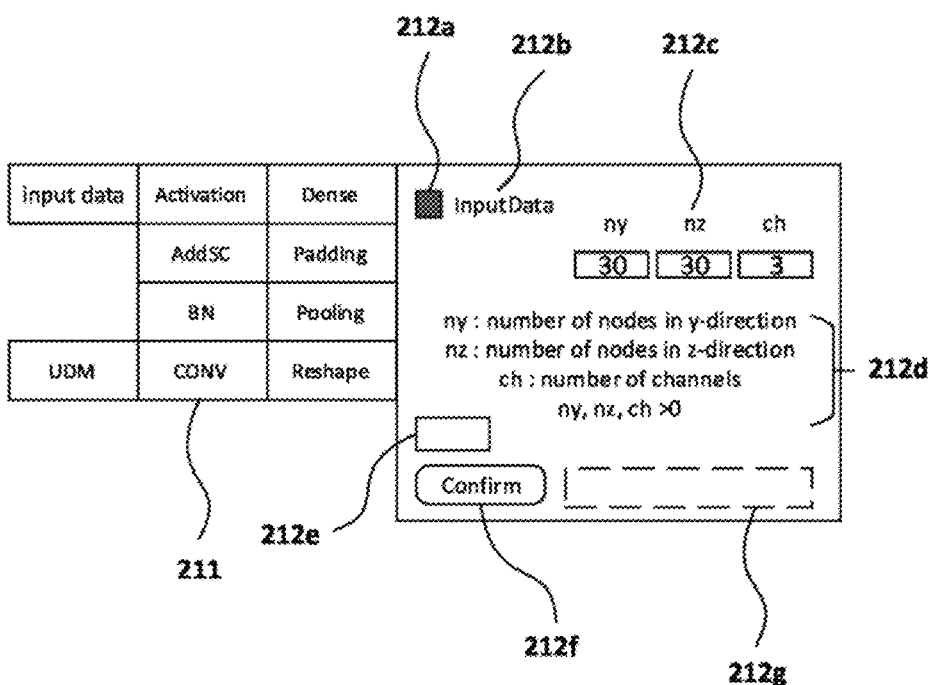
FIGS. 4A, 4B, and 4C are views illustrating a layer input unit in the graphic user interface of FIG. 3 according to the embodiment of FIG. 1.
Figure 4B:
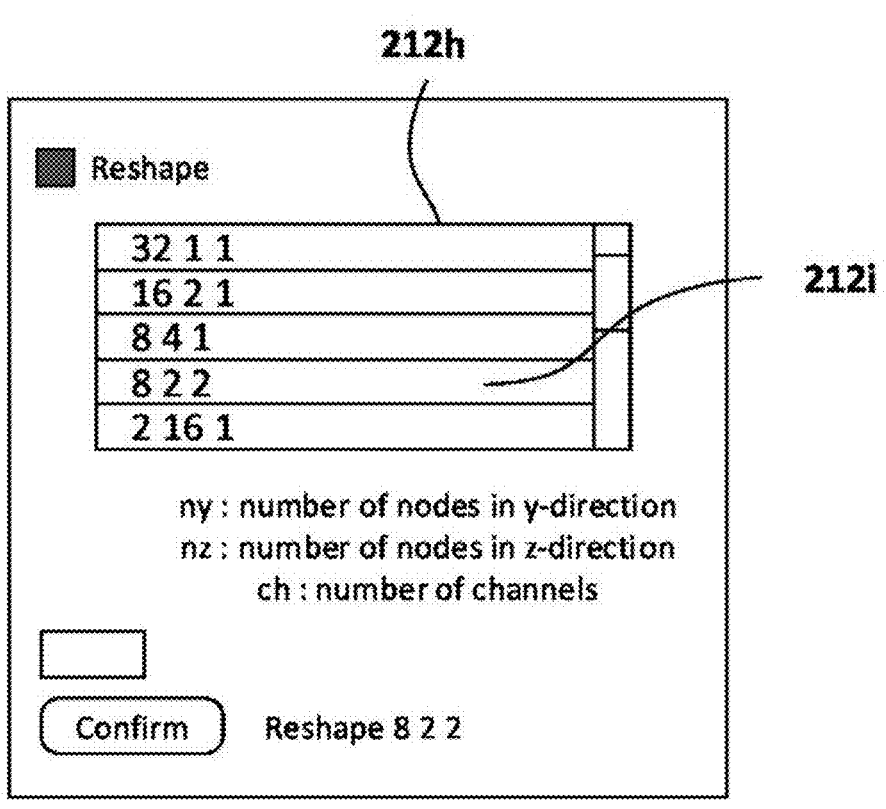
Figure 4C:
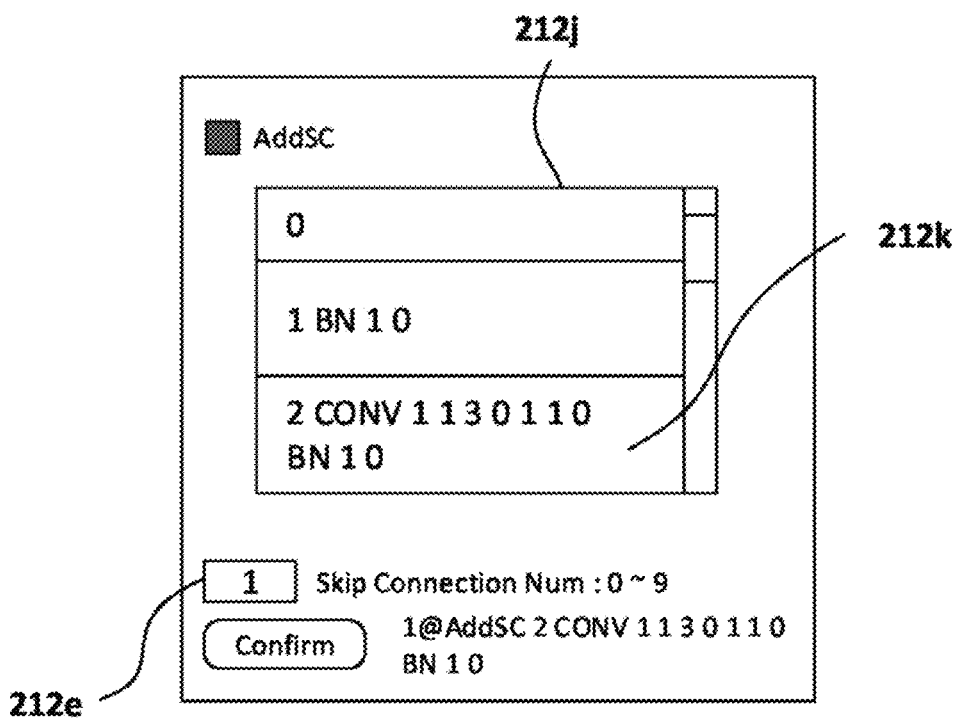

FIGS. 4A to 4C are views illustrating the layer input panel 210 of the graphical user interface of FIG. 3 according to the embodiment of FIG. 1.

Referring to FIGS. 2 and 4A, the layer input step S100 is a step of selecting layers that are each component and inputting parameters for them when designing a layer model applied to machine learning. This step is performed by the layer input panel 210.

The layer input unit 110 operates in conjunction with the visually expressed layer input panel 210. It includes a layer type determination panel 211 for selecting the type of layer and a layer parameter input panel 212 for inputting parameters according to the type of the selected layer. The layer input unit 110 receives the type and parameters of the layer from the user and transmits the input layer type and parameter values applied thereto to the layer model management unit 120.

The layer input panel 210 includes a layer type determination panel 211 and a layer parameter input panel 212. The configuration and operation of the layer type determination panel 211 and the layer parameter input panel 212 are described.

The layer type determination panel 211 is a button that allows the user to select various artificial intelligence layers. FIG. 4A shows 10 buttons, and the user can click the buttons corresponding to different types to input the desired layer. The number of buttons is not limited to the number presented, and as more types of layers are added, the number of buttons related to them may increase. The contents and visualization characteristics of each type of layer are briefly described as follows.

The input data layer is a layer that defines the first input learning data. The shape in which data is input may be defined by the number of layer height nodes (ny), the number of width nodes (nz), and the number of channels (ch).

ny refers to the number of nodes in the height direction of the layer, nz refers to the number of nodes in the width direction of the layer, and ch refers to the number of channels. (ny, nz, ch) is called the shape of the layer. For convenience of description, the upper direction of the screen is set to the +y direction, and the inner direction of the screen is set to the +z direction.

The activation layer is a layer that non-linearly transforms the input node values and outputs them. This makes it possible to model complex functions and learn from data.

The add-skip connection (AddSC) layer is a layer that makes an add-skip connection between two selected layers to improve machine learning performance. Its input configuration and visualization method are described in more detail below.

The batch normalization (BN) layer is a layer that calculates the average and variance of nodes on a batch basis and then performs centering and scaling through normalization. This can help improve the stability and efficiency of deep neural network training.

The convolution (CONV) layer is a layer that performs the mathematical operation of convolution to extract features from input data.

The dense layer is a densely connected layer where every input node is connected to every output node. This layer outputs the results of mathematically performing matrix operations.

The padding layer is a layer that expands the height or width of input data. It is mainly expanded by adding zero values to the outside of the input data.

The pooling layer is a layer that reduces the shape of input data by performing operations such as averaging the values in a certain area or extracting the maximum value.

The reshape layer is a layer that changes the shape of the input data without changing the total number of nodes in the layer to match the data type required by the next layer. Its input configuration and visualization method are described in more detail below.

The user defined model (UDM) layer refers to a model defined by the user, and this model can be created by the user and then applied to the system.

Meanwhile, the layer parameter input panel 212 allows input of detailed parameters for the corresponding item when a layer type is selected in the layer type determination panel 211. In the layer type determination panel 211, the type of layer may be selected, and in the layer parameter input panel 212, parameters necessary for the selected layer are input. The order of inputting a layer is also to proceed with the layer type determination panel 211 first and then input related information into the layer parameter input panel 212.

Regarding the layer parameter input panel 212, each corresponding component is described in detail as follows.

Referring again to FIG. 4A, the layer color 212a is a function that classifies each layer by color and provides a visual clue to the user. To easily identify interacting layers, a color is displayed according to the type of layer, and this can be set by user.

When the layer type is determined in the layer type determination panel 211, the name of the layer 212b is displayed thereon. This allows users to understand which layer they are accessing and the features associated with that layer.

The layer parameter input window 212c allows the user to input values for parameters for the corresponding layer. The layer parameter input window 212c may be different for each layer. In the embodiment of FIG. 4A, three parameters are required for the input data layer.

In addition, one parameter input window will appear, where for example, parameter values may be entered by separating them with commas (,), etc. Meanwhile, it is preferable to display an input window equal to the number of parameters because it is easy to use and reduces mistakes. Furthermore, frequently used values or recommended values can be pre-entered as default values in the layer parameter input window 212c.

Meanwhile, in this embodiment, the parameter input window 212c is displayed as many parameters as required, and the valid range can be given for entering each value. At this time, if a value larger than the maximum value of the valid range is input, it can be automatically corrected and converted to the maximum value, and if the input value is less than the minimum value, it can be automatically corrected and converted to the minimum value.

Meanwhile, the reshape layer is a layer that changes the shape of the input layer. Therefore, the total number of nodes does not change, and there can be multiple shapes that can be changed. For example, if the input layer is (ny, nz, ch)=(4, 4, 2), multiple examples are possible such as (32, 1, 1), (8, 2, 2), (16, 2, 1), and the like. Such calculations not only cause inconvenience to users, but also increase the probability of errors occurring during calculations.

To address these issues, in the case of the reshape layer of this embodiment, three layer parameter input windows 212c are displayed, and instead of the user directly entering ny, nz, and ch values, calculation is carried out in advance by the layer model process unit 130, and possible shapes can be displayed in a scroll view format to allow selection.

As explained with reference to FIG. 4B, when the shape of the previous layer is (4, 4, 2), various possible cases are displayed in the reshape scroll view 212h for selection. Among these, when the user selects the desired shape bar 212i, the three layer parameter input windows 212c are displayed, and this is more convenient and reduces errors than entering them individually. When using a reshape layer, the to-be reshaped previous layer must be selected first. Selecting a layer is explained when explaining the 3D visualization step of the layer model.

The layer parameter description 212d provides a description of the parameters that must be entered in the layer parameter input window 212c. Information is provided to the user about what each parameter represents, what value to enter, or the valid range of the value to be entered.

Meanwhile, FIG. 4C is a view for explaining skip connection (SC).

Referring to FIG. 4C, when using the add-skip connection layer, the skip connection (SC) number input window 212e is used to select two layers to add-skip connections in the layer model. A value between 0 and 9 can be entered into the skip connection number input window 212e. A value between 0 and 9 is used to identify connection points of layers and may be referred to as identification information. If necessary, various characters can be applied in addition to the numbers between 0 and 9.

For example, if 1 is entered in the skip connection number input window 212e, when it is passed to the layer parameter input panel 212, @ is added to the end of the skip connection number, such as 1@CONV 2 2 10 0 1 1, 1@BN 1 0. This makes it possible to distinguish it as a skip connection number. Other symbols besides @ can be used.

Here, the add-skip connection (AddSC) layer will be further explained in relation to the skip connection number. The add-skip connection (AddSC) layer connects additional layers by skipping between two layers with the same skip connection number. The parameters of the add-skip connection (AddSC) layer are generally 0 or indicate one or more additional layers.

For example, 1@AddSC 0 means that two layers are simply connected without a layer. Here, 0 becomes the parameter. For another example, in 1@AddSC 2 CONV 1 1 3 0 1 1 0 BN 1 0, the 2 CONV 1 1 3 0 1 1 0 BN 1 0 after AddSC becomes the parameter. 2 means there are two additional layers, and in this case the additional layers are the convolution (CONV) layer CONV 1 1 3 0 1 1 0 and the batch normalization (BN) layer BN 1 0.

That is, the parameters of the add-skip connection (AddSC) layer consist of 0 or 1 or more layers, and these are layers added between previous layers with the same skip connection number as the skip connection number of the add-skip connection (AddSC) layer. Here, additional layers included in the parameters of the add-skip connection (AddSC) layer may be named skip connection layers. The additional layers that are parameters of this add-skip connection (AddSC) layer require complex calculations because, if the skip connection number is 1, the shapes of the layers added between the previous layer with 1@ and the 1@AddSC layer must be matched without error.

In this regard, just like in the reshape layer, parameters can be displayed and selected in the add-skip connection (AddSC) layer. That is, it is calculated in advance through the layer model process unit 130, and possible additional layers are displayed in a scroll view format so that they can be selected. Referring to FIG. 4C and FIG. 7D, a figure for visual explanation of the skip connection, which will be described later, when there is a previous convolution (CONV) layer with 1@ (1@CONV 2230110, A in FIG. 7D), when the skip connection number is set to 1 in the latter layer input and the AddSC button is clicked, various possible cases (i.e. add-skip connection (AddSC) layer parameters) are displayed on the AddSC scroll view 212j as shown in FIG. 4C for selection.

Among these, selecting the additional layer bar (212k) desired by the user is not only convenient and reduces errors, but also saves time, making layer model design much easier than displaying multiple layer parameter input windows 212c and entering them. For reference, in the add-skip connection scroll view (212j), 0 means direct connection without an additional layer, and 1 BN 1 0 means that only one batch normalization (BN) layer is an additional layer.

As a result, the user may prevent physical and/or logical errors that may occur when entering parameters required for the corresponding layer.

The confirmation button 212f can be clicked after the user enters all parameter items.

When the confirmation button 212f is finally clicked, information including the parameters of the corresponding layer is displayed in the layer input filtering unit 115, allowing the user to check whether the layer selection and parameters have been entered as desired S150. This may be expressed in the layer information display window 212g within the layer parameter input panel 212. FIGS. 4B and 4C show these embodiments.

In this way, the value for which the valid range for the parameter applied to the layer is set is automatically modified, the available parameters are automatically calculated, displayed, and selected, or the confirmation button 212f is used to confirm again. Therefore, not only can users prevent users from inputting incorrect values and making mistakes, but even non-experts can easily design machine learning models.

Meanwhile, if the layer is a reshape or add-skip connection layer, recommended parameters can be automatically displayed for selection.

Afterwards, the process moves on to applying the layer state panel 220.

Figure 5A:
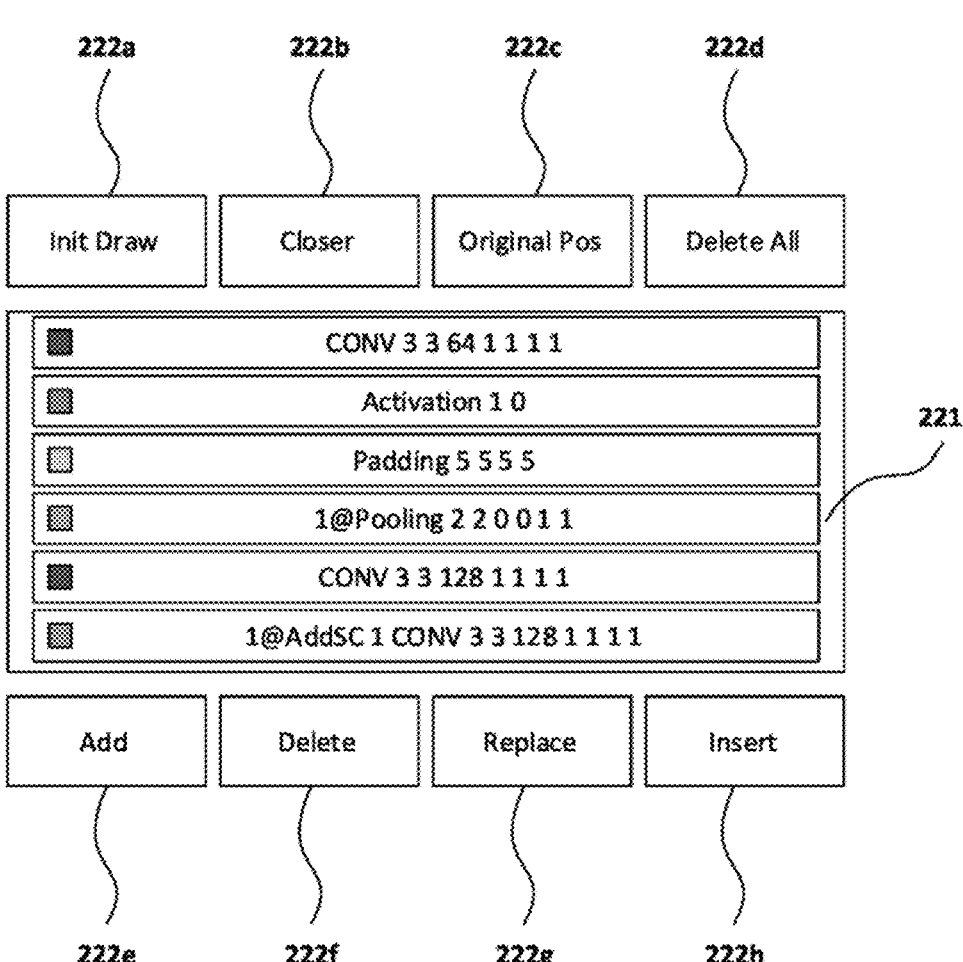
FIGS. 5A and 5B are views illustrating the layer state panel 220 of the graphical user interface of FIG. 3 according to the embodiment of FIG. 1.
Figure 5B:
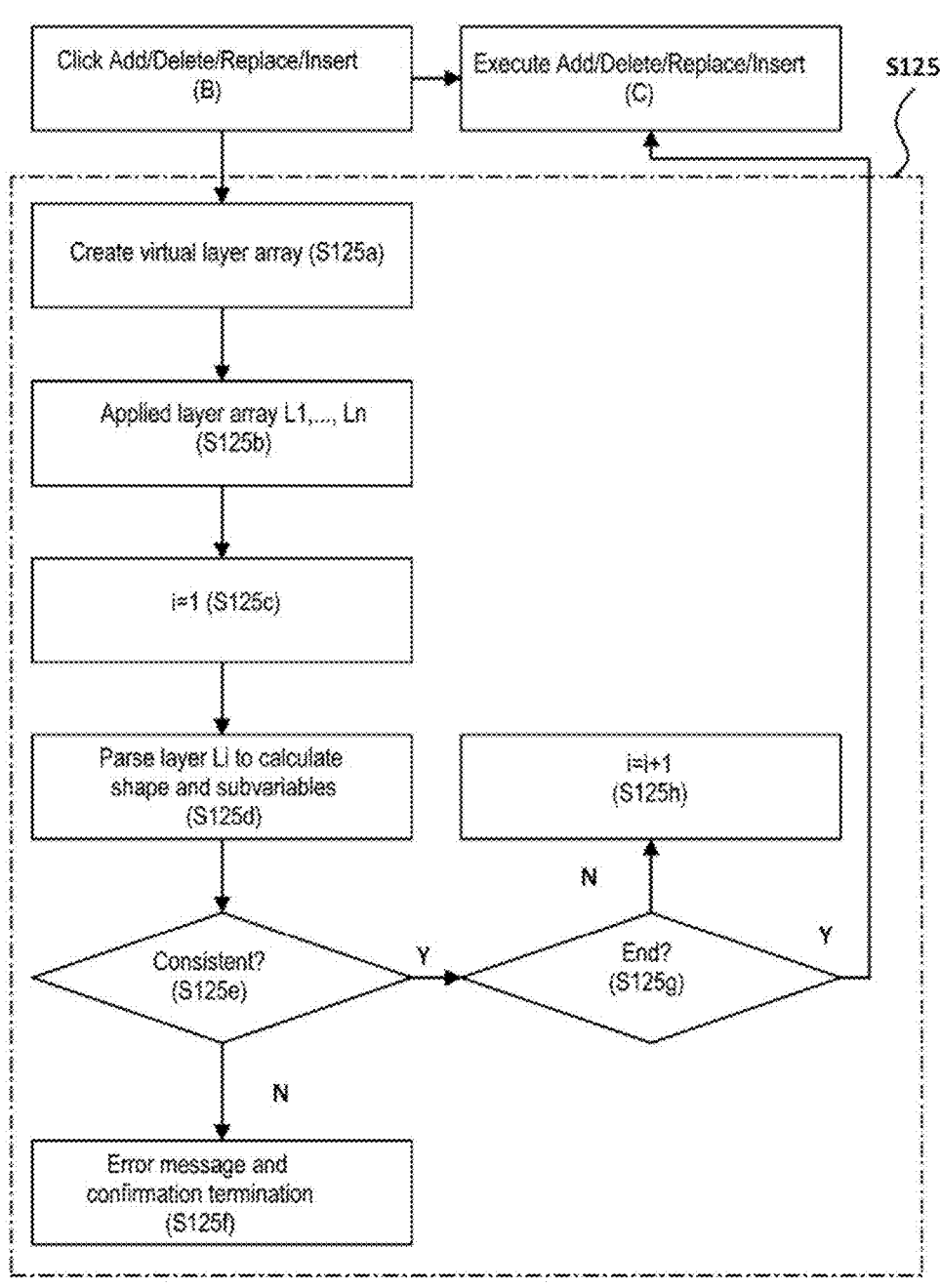

FIGS. 5A and 5B are views illustrating the layer state panel 220 of the graphical user interface of FIG. 3 according to the embodiment of FIG. 1.

The layer model configuration step S200 is performed by interacting with the interface of the layer state panel 220 in the layer model management unit 120. The layer model management unit 120 collects information related to the layer received from the layer input unit 110 and constructs an overall layer model. The layer model management unit 120 operates in conjunction with the visually expressed layer state panel 220, which includes the layer state display panel 221 that displays the state of the layer and the layer state control buttons 222 that receives commands to control the layer state. The layer input unit 110 receives input of the type of individual layer and its parameters, while the layer model management unit 120 receives input related to the expression, arrangement, and modification of the input layer.

First, the layer state display panel 221 displays components in the current state of the layer model. In particular, the layer model may vary depending on the order in which layers with individual characteristics are applied, and the order of individual layers can be identified in the current state window. Additionally, it may be implemented to select a layer and change its order.

Referring to FIG. 5A, the type of each corresponding layer and applied parameter values are indicated, and several bars are listed in order. When constructing a layer model, this indicates which layer corresponds to the corresponding component.

If necessary, each layer can be selected to change the order or position of the layers or readjust the parameters of that layer. While displaying the overall information of the layer model, modifications such as replacing, inserting, and deleting each component layer can be made here.

The layer state control button 222 includes control buttons related to the current state of the layer model. The function of each button is described below. First, it is related to the visualization of the layer model displayed in the layer model visualization panel 230.

The initialization draw button 222a resets the visualized layers to their initial state. That is, if the image is rotated, the mouse wheel is used to zoom in or out, or the layer is moved, clicking this button returns the layer to its initial position and size.

The closer button 222b is used to effectively close the gap between layers. This can be useful if there are many layers, and the volume of space occupied by a layer is reduced, and clicking this button reduces the space between layers and makes layer components denser.

The original position button 222c is used to expand the spacing again so that narrowly adjacent layers have their original spacing. That is, if the layer spacing was previously compressed using the closer button 222b, clicking the original position button 222c increases the spacing between layers back to the original spacing.

The delete all button 222d is used to delete all layers in the layer state display panel 221. This can be used when designing a new layer model or initializing it to proceed. In some cases, the delete all button 222d may be activated before loading the saved layer model, thereby triggering the function of deleting the entire layer model.

Next, the design of the layer model and its editing are described. Buttons allow users to add, delete, replace, and insert layers within the interface. In particular, even if the type and parameters of the layer are determined in the layer input unit 110, it is necessary to determine again how to design the model by arranging other layers and in what order, and this function is handled therein. Its main functions are as follows.

The add button 222e is used to add a layer to the end of a layer. To add a new layer to the present layer model, the add button is clicked to add the selected layer at the end of the layer model.

The delete button 222f is used to delete the selected layer. This can be implemented in various ways. To delete a layer, a layer is selected with the left mouse button and then the delete button is clicked. In this case, the selected layer is removed from the layer state display panel 221.

The replace button 222g is used to replace the selected layer with another layer. To replace a layer, the to-be replaced layer is selected with the left mouse button, and then the replace button is clicked. The selected layer is replaced with the layer displayed in the layer information display window 212g by pressing the confirmation button 212f in the layer input panel 210.

The insert button 222h is used for insertion, and the difference from add button 222e is that the target layer can be inserted at a desired point in the layer model. Layers can be added to the middle of a layer model rather than to the end. In terms of how the interface works, to insert a layer, the position where to insert the layer is selected with the left mouse button, and then the insert button is clicked. In this case, the layer displayed in the layer information display window 212g is added immediately before the layer selected in the layer state display panel 221.

Layer Error Verification Function

The layer model configuration step S200 of the present disclosure may further include a layer error verification step S250 for verifying errors in the layer.

The shape of the layers can generally vary depending on the previous layer, except for the first input data layer. Accordingly, the layers comprised in the layer state display panel 221 are at risk of causing errors when clicking the add button 222e, delete button 222f, replace button 222g, and insert button 222h. Preventing these errors is important for program stability. These are described with reference to FIGS. 5A and 5B. FIG. 5B is a view showing the layer error verification step S125 of the layer model error verification unit 125. The layer error verification step S125 of the model error verification unit 125 operates in conjunction with the layer model process unit 130.

When the add, delete, replace, insert buttons 222e to 222h of FIG. 5B are clicked (B), the operation can be immediately executed (C) on the layer state display panel 221. Meanwhile, since the layers in the layer state display panel 221 are visualized in the layer model visualization panel 230, if an error occurs therein, it may cause problems throughout the program.

In an embodiment of the present disclosure, rather than executing (C) directly from (B), the layer error verification step is performed through the layer model error verification unit 125 in the middle.

The layer error verification step S125 operates as follows. When the add, delete, replace, and insert buttons in FIG. 5B are clicked (B), the layer name and parameter information in the layer state display panel 221 are immediately copied in order to create a virtual layer array S125a. Next, the functions of addition, deletion, replacement, and insertion are applied to define a new layer array L1 . . . Ln (assuming there are n total) S125b.

Now, while performing a loop statement (S125c to 125h) from the first layer L1 to Ln, each layer Li is parsed by the layer model process unit 130 to obtain the shape and corresponding parameters of each layer to check whether there is a contradiction with the next layer S125e. These contradictions can occur in various cases.

For example, there may be a contradiction where the input data layer does not come first or there are two or more layers. The shape of the previous layer may be small enough to make it impossible to operate a convolution or pooling layer, or when applying a reshape layer, the total number of nodes may not match the previous layer, and in particular, when there is an AddSC layer and if the middle layer is deleted, the shapes of the layers change and a contradiction occurs.

If such a contradiction occurs, the corresponding error message is issued, and it terminates S125f. If no contradiction occurs, it goes down to the next layer S125h. In this way, when the loop statement is completed without contradiction for all layers S125g, the operation on the layer state display panel 221 corresponding to the click (B) of the add, delete, replace, and insert buttons is executed (C). Therefore, a layer model is configured in the layer state display panel 221, and the layer model process step S300 is performed again to stably display the state of the layers visualized in the layer model visualization panel 230.

The layer model process steps S300 are as follows. The layers that pass the layer error check as above and are stably configured in the layer state display panel 221 are parsed again by the layer model process unit 130 to perform calculations necessary for the 3D visualization method of the layer model visualization panel 230, such as the location of each layer, the location of nodes, and the location of relationship lines as described below in 3D space.

Referring again to FIG. 3, when the configuration of the layer model is designed in the layer model management unit 120 and the layer state panel 220, the layer model for the portion determined based on the present layer is stably visualized S400 on the layer model visualization panel 230 through the layer model process step S300. The layer model visualization graphic 500 provides functions such as enlargement, reduction, movement, and rotation within the layer model visualization panel 230, providing the ability to observe the layer model visualization graphic 500 from various perspectives.

3D Visualization Method
(a) Visualization Based on Layer Input

Figure 6A:
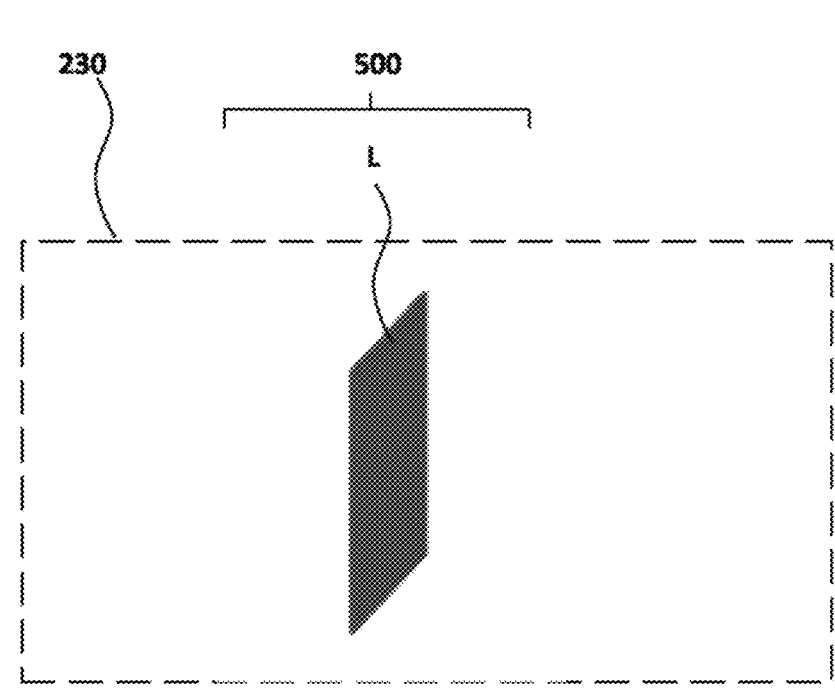
FIGS. 6A and 6B are views illustrating a 3D visualization process of a method for designing the machine learning model according to the embodiment of FIG. 1.
Figure 6A:
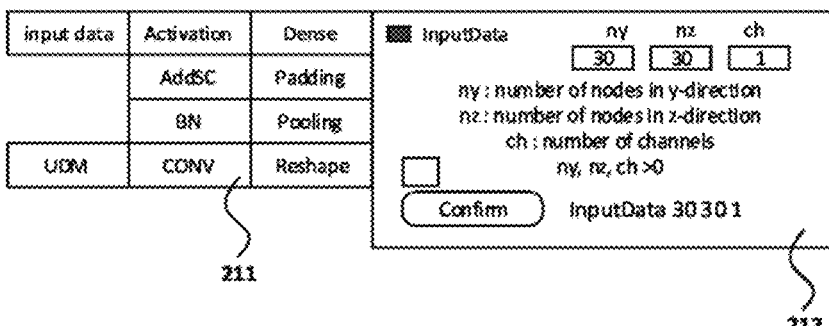
Figure 6A:
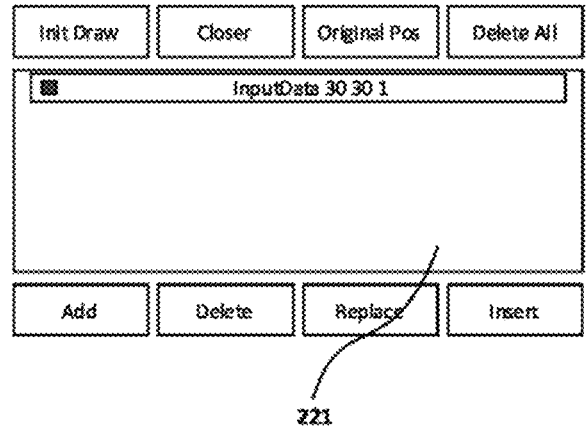
Figure 6B:
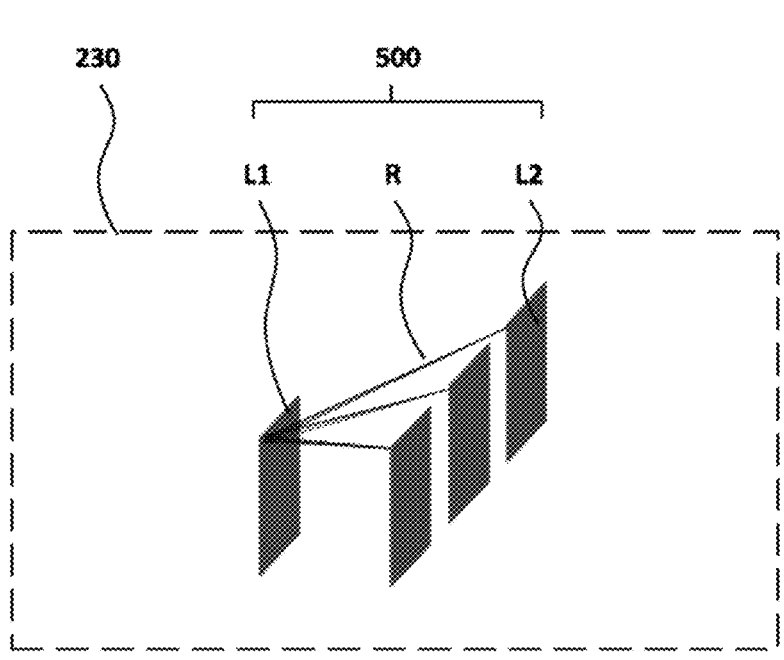
Figure 6B:
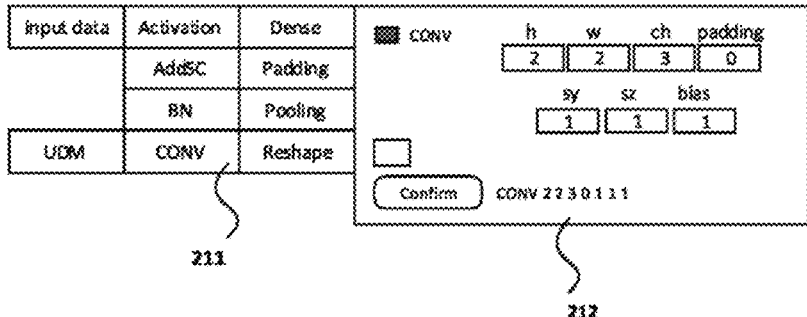
Figure 6B:
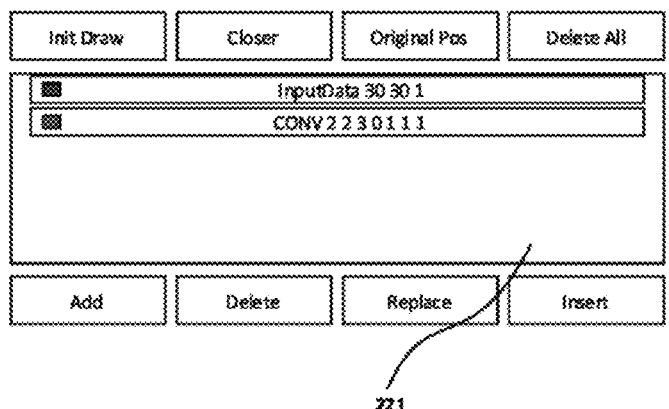

FIGS. 6A to 6B are views illustrating a 3D visualization process of a method for designing the machine learning model according to the embodiment of FIG. 1.

Referring to FIG. 6A, using the layer input unit 110 and the layer input panel 210, the user inputs the input data (InputData) layer, which is the first layer, in the layer input step S100. Information about these layers is input using the layer type determination panel 211 and the layer parameter input panel 212, and the present layer model state is displayed on the layer state display panel 221.

One layer was input and, accordingly, one square unit (L) is expressed in the layer model visualization graphic 500. Depending on the type and characteristics of the input layer, various types of square units (L) are added, and the overall layer model is visualized. The rules by which the layer model visualization graphic 500 is shown are described as follows.

In the design method of the present disclosure, one or two or more square units (L) are displayed for each layer. When the shape of the layer is (ny, nz, ch), the size of the square unit is the number of nodes in the y direction (ny) and the number of nodes in the z direction (nz). If it exceeds a certain size, the size of the square unit may be expressed in appropriate proportion to ny and nz. The number of square units visualized for one layer depends on the number of channels in the layer. For example, if a layer has 1, 2, or 3 channels, it will display 1, 2, or 3 square units respectively. Additionally, when the number of channels in a layer is excessively large, a symbol such as " . . . " is displayed between square units representing each channel, so that multiple square units can be omitted.

The shape of the selected layer, such as the number of nodes in the y direction (ny), the number of nodes in the z direction (nz), and the number of channels (ch), may be displayed at the top of the screen. This may optionally be provided as an option by the user. Further, when the user clicks on an area where the layer shape is displayed, an explanation of how the shape is calculated may be provided, and this may also be optionally provided by the user. The user may always view information about the corresponding layer by clicking on the square unit (L) on the screen.

Further, the text of the layer in the layer state display panel 221 corresponding to the clicked layer can be changed. This is an important function when deciding on a reshape layer.

Meanwhile, the color of the square unit can be specified separately depending on the type of layer, and layers of the same type can be assigned the same color. The user may easily visually check what type of layer it is based on the color of the square unit.
(b) Visualization Representing Relationships between Layers Referring to FIG. 6B, the user inputs a second layer in addition to previously inputting one layer. Parameters of the corresponding layer, a convolutional (CONV) layer, are input through the layer type determination panel 211 and the layer parameter input panel 212, and at this time, the layer parameter input panel 212 may check the validity of the parameter input and make a re-request if an incorrect value is entered. In an embodiment of the present disclosure, values outside the input range can be automatically corrected in the layer input filtering unit 115.

Meanwhile, when the parameters of the layer are entered, then the confirm button 212$f$ is clicked for confirmation, and then the add button 222$e$ is clicked to pass the layer error verification step S125, information about the layer is added to the layer state display panel 221, and the layer is visualized in 3D in the layer model visualization panel 230. The difference between FIGS. 6A and 6B is that when two layers are created, a relationship line (R) is shown for each layer. The relationship line (R) is visualized according to the following rules.

A relationship line (R) represents the connection between a node in one layer and a node in the previous layer. Therefore, this connection means a transformation relationship between the node value of the present layer and the node value of the previous layer. A relationship line can generally be expressed as a line connecting a node of a previous layer used to calculate the node value of the present layer. For example, if the values of 4 nodes of the previous layer are needed to create a node of the present layer, a line is drawn between the first node point of the present layer and the 4 node points of the previous layer required to create it. Additionally, by displaying only one representative node rather than displaying the relationship lines of all nodes, the user can only understand the relationship between layers.

Relationship lines (R) include general relationship lines and special relationship lines, and the differences in specific details are as follows.

General relationship lines represent relationships between layers that need to be learned during machine learning, and these connections may be called weights or edges. These weight values are learned to determine the node value of the present layer. Other lines representing relationships between layers that do not require learning are special relationship lines.

The relationship lines connecting the nodes of the CONV, dense, and batch normalization (BN) layers are general relationship lines because they are relationship lines determined through learning. On the other hand, the relationship lines connecting the nodes of the reshape, activation, and pooling layer are special relationship lines because they are not relationship lines obtained through learning.

The relationship line corresponding to the padding layer is also a special relationship line except that it is additionally padded. However, the method of drawing the padding layer is described in more detail below as an embodiment of the present disclosure. The add-skip connection (AddSC) layer may consist of multiple layers so that general relationship lines and special relationship lines may be mixed and used depending on the configuration layer.

The general relationship line shown in the present disclosure is characterized by forming a line with related nodes of the previous layer based on the creation of one node in the created layer. In this embodiment, general relationship lines are shown in black. It may be shown in a color representing generality, such as white depending on the background. Thus, it is easy to recognize what the relationship line being learned is. It is also possible for the user to specify the color of these general relationship lines.

Meanwhile, the special relationship line represents a relationship that does not require learning. These connections simply involve weighting, transforming, or otherwise processing the node values of the previous layer to the node values of the present layer without the need for learning. In the visualization step, it can be visualized as a line containing color.

Accordingly, the components expressed in the visualization process are described with examples. This visualization method is one of the features of the present disclosure, and through this visualization process, users can understand the current model configuration state more intuitively when designing a layer model. Even if the layer model needs to be modified, it will be possible to modify it more intuitively through the interface of the present disclosure.

(c) Special Visualization Shape

FIGS. 7A to 7D are views illustrating a 3D visualization process of a method for designing the machine learning model according to the embodiment of FIG. 1.

The related drawings relate to 3D visualization of the layered model. Square units can be expressed in different ways depending on the layer characteristics. Each step is described in detail using referenced drawings.

Figure 7A:
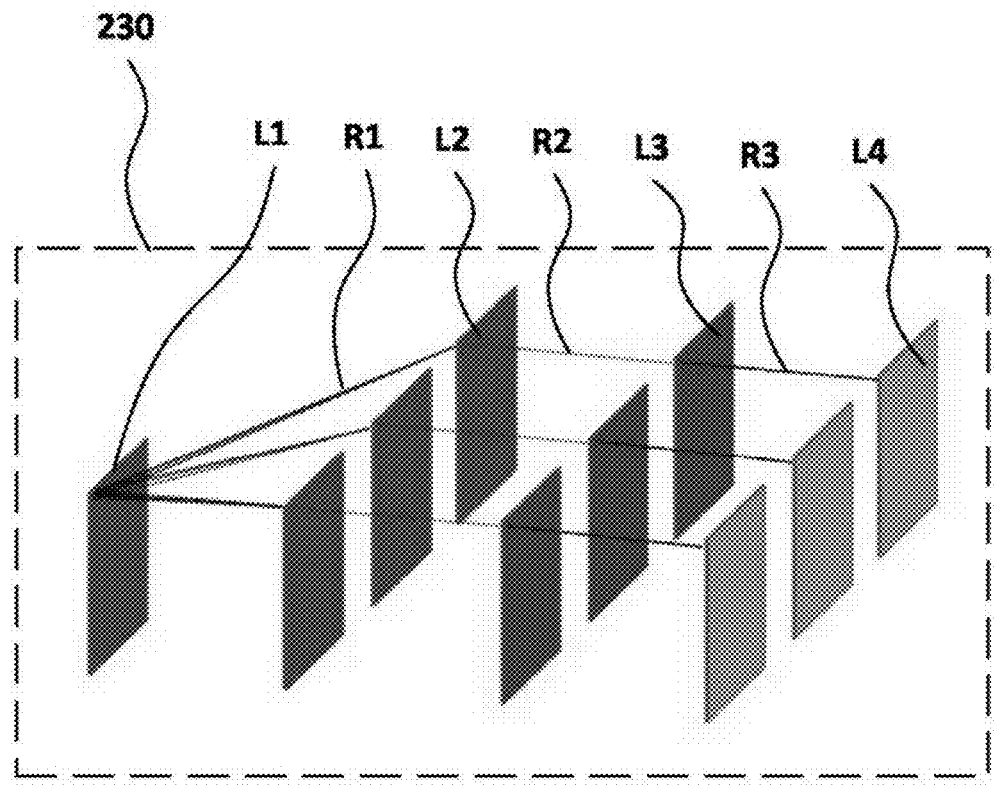
FIGS. 7A, 7B, 7C, and 7D are views illustrating a 3D visualization process of a method for designing the machine learning model according to the embodiment of FIG. 1.
Figure 7A:
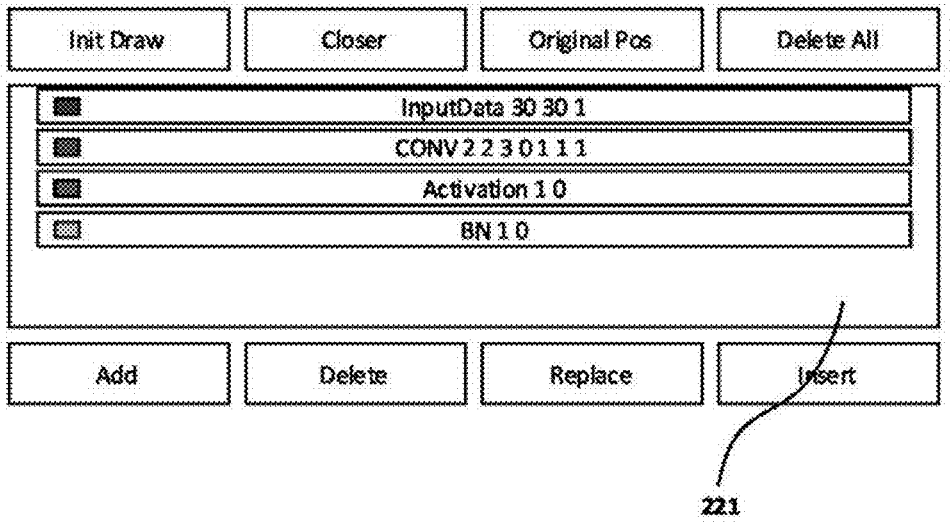

(c-1) Visualization of General Relationship Lines and Special Relationship Lines First, referring to FIG. 7A, in this drawing, the layer model visualization graphic 500 displays a total of four layers (L1, L2, L3, L4), including the input data layer (L1), visualized in 3D. Here, the relationship lines representing the node calculation process of each layer are general relationship lines (R1, R3) and special relationship lines (R2), respectively.

Information on specific layers is displayed on the layer state display panel 221, and with reference to this, it has been visualized to include an input layer (L1), a convolution layer (L2), an activation layer (L3), and a batch normalization layer (L4).

As described above, in FIG. 7A, the general relationship lines R1 and R3 are shown. In the square units (L2, L4) representing each channel of the layer, the process of creating a representative first node is shown by general relationship lines (R1, R3).

Meanwhile, for special relationship lines, the color for each type of layer can be designated the same as the color of the layer, and for general relationship lines, one designated color can be used. In FIG. 7A, R2 is used as the special relationship line. A special relationship line (R2) is shown at the first typical node among the square units (L3) representing each channel of the layer. Between the square units (L3) of the layers, one line is shown at the representative node for each channel.

(c-2) Visualization of Padding Layer

Figure 7B:
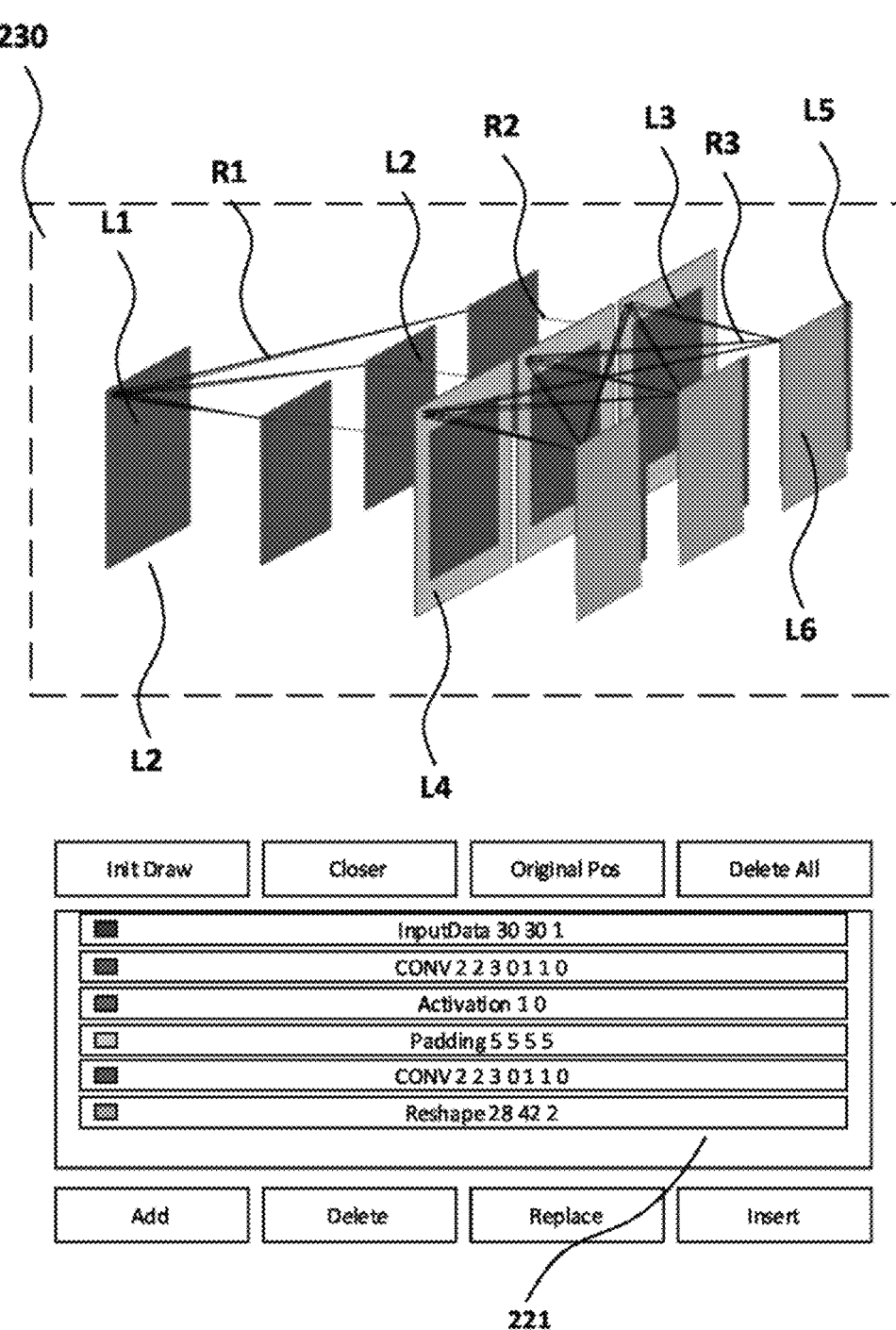

Referring to FIG. 7B, it can be seen that the layer model visualization graphic 500 in this drawing includes one padding layer (L4). As previously defined, the padding layer means adding additional zero data to the outside of the existing data, and in 3D visualization, this can be expressed as adding yellow padding to an existing layer.

In FIG. 7B, the fourth layer (L4) is a padding layer and is expressed as a yellow expanded portion on the outside of the previous layer (L3), intuitively indicating that a padding layer has been added to the existing layer.

In particular, it is characteristic that the square unit corresponding to the padding layer is not drawn separately but is drawn overlapping on the same plane by only adding padding to the previous layer. In FIG. 7B, the square unit (L3) visualizing the third layer and the padding layer (L4) are shown as if they are in the same plane.

When the square units representing a layer are considered to represent a single data set, it can be more intuitively understood that the part expanded by padding is expressed outside the square unit of the existing layer. In the case of a complex layer model, showing the layers in a simplified manner is easier for users to understand, so showing them in this way has advantages in terms of information delivery and user convenience.

(c-3) Visualization of Reshape Layer

Meanwhile, in FIG. 7B, the last layer was added as a reshape layer (L6). Reshape layer refers to the expression of a new layer shape and can be drawn on the same plane as the previous layer. This refers to the reconstruction layer of the data, and this visualizes changes in the form of data, making it easier for designers to understand them.

Like the padding layer, the reshape layer also has the characteristic of being drawn on the same plane as the previous layer, which is similar to the effect caused by the padding layer. It has the advantage of allowing users to intuitively recognize a layer model with reduced complexity.

(c-4) Detailed Visualization of Individual Layer

Figure 7C:
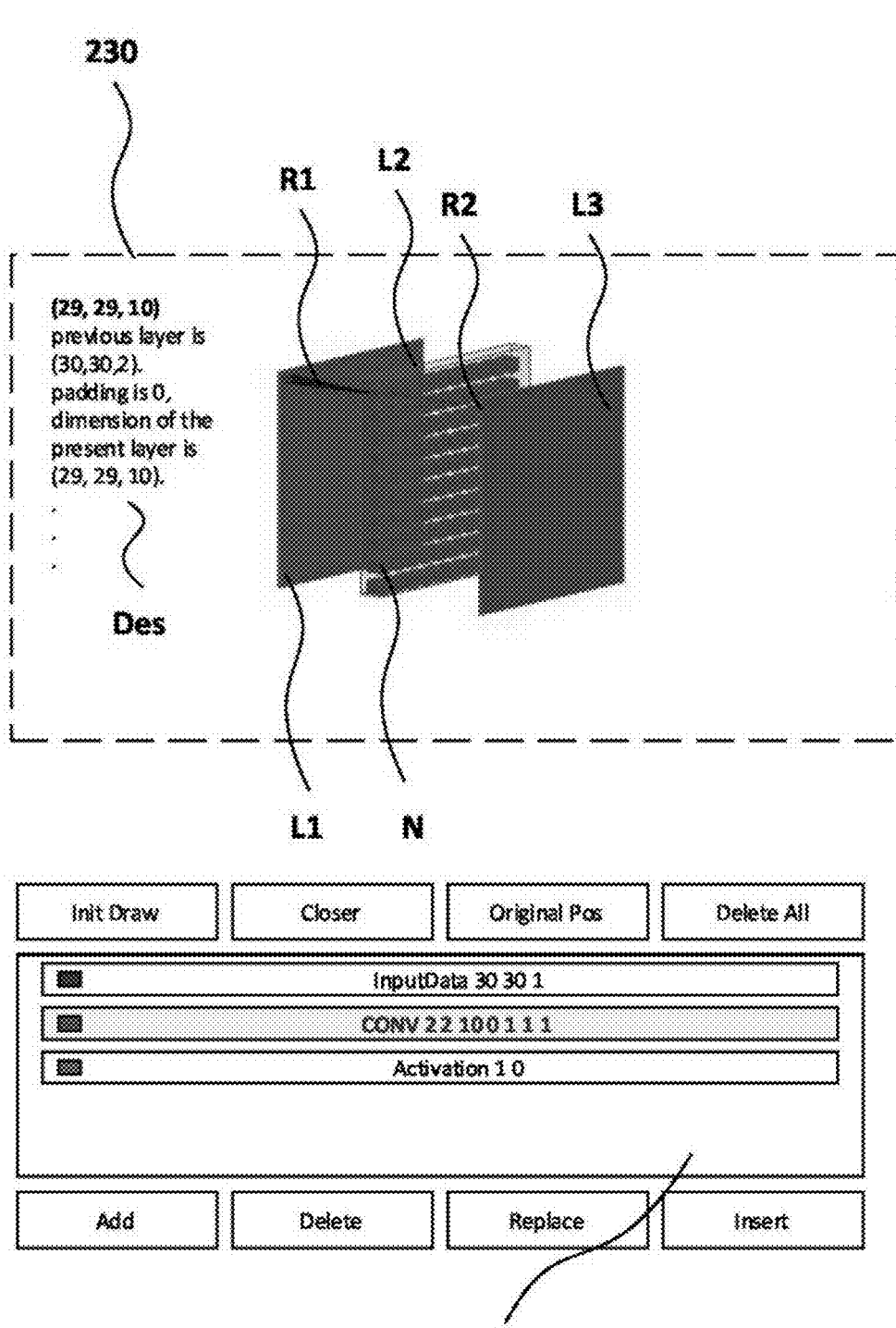
Figure 7D:
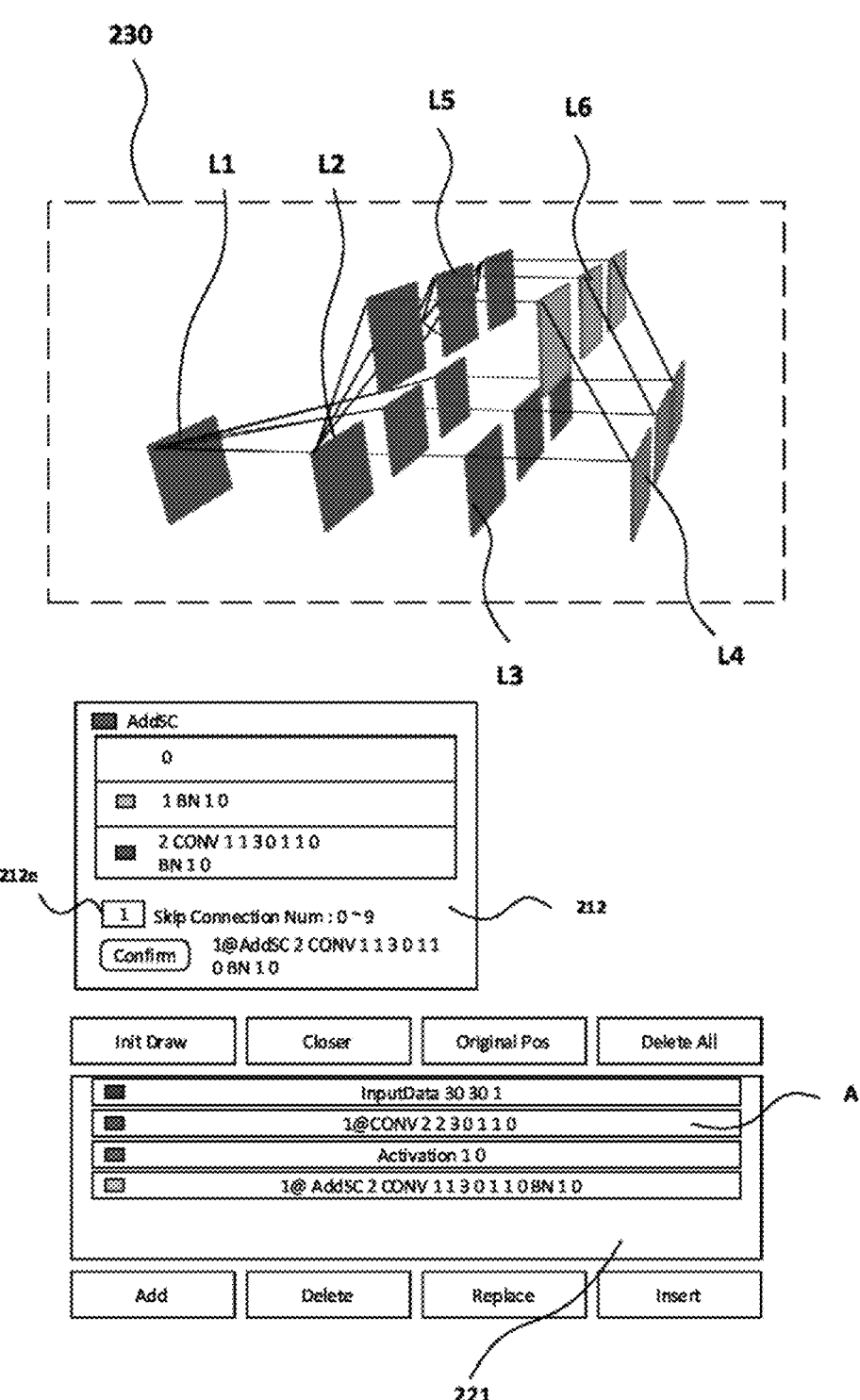

Referring to FIG. 7C, visualization is displayed when one layer is selected by the designer in the layer model visualization panel 230. When selecting a square unit to visualize a node within a layer, this visualization relates to a method of specifically expressing the nodes contained within the actual layer.

At this time, there may be several ways to select a layer within the layer model visualization graphic, for example, CTRL+left mouse button click can be considered the starting function. The method of selection can be defined in various ways depending on user convenience.

When one layer is selected, the square unit (L2) of that layer itself is displayed transparently, and the internal nodes (N) are shown. Meanwhile, when one layer is selected, the layer state display panel 221 may display that the layer has been selected. In this embodiment, the letters are changed to red. If necessary, additional information about the layer can be expressed, such as an explanation of how the layer's shape or shape value was calculated (Des). This method of visualizing and selecting layers is useful when selecting a layer to be reshaped.

Although not shown in the drawing, when the representation of the node (N) is activated in this way, when an individual node is selected, the relationship line on which the corresponding node is created may be expressed separately. If the relationship between data for a specific node needs to be confirmed, the user can secondarily select it to identify the generated data relationship of the nodes.

(c-5) Visualization of Skip Connection

Referring to FIG. 7D, a visualization method when an add-skip connection (AddSC) layer is included is shown.

First, the layer may be added by clicking the add-skip connection button in the layer type determination panel 211, and if this is selected, the parameter input window is shown like any other layer, it can be input therein. However, as before, the layer parameter list scroll view of the layer parameter recommendation function is shown, allowing user to select among them.

As in FIG. 7D, it is displayed in the layer parameter input panel 212. Through the skip connection layer number input window (layer parameter input panel 212*e*), the skip connection number of the layer can be input. Now, as shown in FIG. 7D, the skip connection number of the layer to be connected is input in the skip connection number input window 212*e*. In this drawing, 1 is entered to connect to the previous layer (A) 1@CONV 2 2 3 0 1 1 0 with skip connection number 1. If there is no layer with skip connection number 1 entered before the add-skip connection (AddSC) layer, a layer with skip connection number 1 can be added or modified using the replace button described in the layer model modification step S400.

In the case of a skip connection layer, additional layers (L5, L6) are drawn in parallel between two layers with the same skip connection number at a location away from them (here, in the +y direction). In this drawing, the 5th and 6th layers (L5, L6) are shown as skip connection layers. This step aids to understand data more easily by visualizing the relationships between different layers.

In this embodiment, a visualization method according to the characteristics of 10 defined layers is proposed, but a similar type of visualization method can be defined for other layers that apply similar concepts. In particular, in the case of a user-defined model (UDM) layer, the characteristics of layers with similar effects can be combined and used for visualization of the layer, and this application process can be a combination of the illustrated expression methods.

One embodiment of the present disclosure described above is merely illustrative, and those skilled in the art will be able to appreciate that various modifications and other equivalent embodiments are possible. Therefore, it will be understood that the present disclosure is not limited to the forms mentioned in the detailed description above. Therefore, the true scope of technical protection of the present disclosure should be determined by the technical spirit of the attached patent claims. Further, the present disclosure should be understood to include all modifications, equivalents and substitutes within the spirit and scope of the present disclosure as defined by the appended claims.

What is claimed is:

1. A method for designing a machine learning model using a 3D user interface, the method comprising:
   a layer input step of inputting a type of a layer and parameters of the layer using a layer input panel including a layer type determination panel and a layer parameter input panel;
   a layer model configuration step of receiving the type and parameters of the layer selected in the layer input step, constructing a layer model using the input layers and displaying a configuration of the layer model on a layer state display panel of a layer state panel;
   a layer model process step of parsing the layer model displayed on the layer state display panel of the layer state panel to calculate a layer position and node position for visualization; and
   a layer model 3D visualization step of visualizing the layer model calculated in the layer model process step in 3D, wherein in the layer model 3D visualization step, when defining the shape of the layer as (ny, nz, ch), the layer included in the layer model is represented as ch square units (L) having a height of the ny value and a width of the nz value, and wherein in the layer model 3D visualization step, when the layer model includes two or more layers, the preceding layer is called a previous layer, and the subsequent layer is called a present layer, and a relationship line connecting a point corresponding to one current node for the square unit (L) corresponding to the present layer and a point of at least one previous node belonging to the square unit (L) corresponding to the previous layer required to form the one current node is visualized.

2. The method of claim 1, wherein the layer input step further comprises a layer input filtering step of examining whether input values are invalid for the parameters according to the type of the input layer.

3. The method of claim 1, wherein the layer model configuration step further comprises layer error verification step of verifying errors that may occur in the a context of each layer for the type and parameters of the input layer.

4. The method of claim 2, wherein in the layer input filtering step of the layer input step,
   when inputting the parameters of the layer in the layer parameter input panel for the type of the layer selected in the layer type determination panel, a layer parameter input window with a valid range set is displayed according to the type of the layer, and
   when the value entered in the layer parameter input window is outside the valid range, it is automatically corrected.

5. The method of claim 2, wherein in the layer input filtering step of the layer input step,
   when inputting the parameters of the layer in the layer parameter input panel for the type of the layer selected in the layer type determination panel,
   if the layer is a reshape layer or add-skip connection (AddSC) layer, recommended parameters are automatically displayed for selection.

6. The method of claim 1, wherein in the layer input step,
   when the input layer is an add-skip connection (AddSC) layer, parameters of the add-skip connection layer consist of skip connection identification information and skip connection layers, and
   the skip connection layers are added between two layers having the skip connection identification information.

7. The method of claim 1, wherein the layer type determination panel allows selection of an input data layer, an activation layer, a batch normalization layer, a convolution layer, a dense layer, a padding layer, a pooling layer, and a reshaping layer.

8. The method of claim 1, wherein the layer type determination panel allows selection of an add-skip connection layer.

9. The method of claim 1, further comprising layer model modification step of modifying the layer model,
   wherein the layer state panel comprises a layer state control button including an add button to add a new layer at the end, a delete button to delete the selected layer, a replace button to replace the selected layer, an insert button to insert the selected layer at a specific location, and a delete all button to delete the layer model visualized in 3D on the layer state display panel.

10. The method of claim 1, wherein in the layer model 3D visualization step,
   when the one previous node is needed to create the one current node, the relationship line is visualized to include color.

11. The method of claim 1, wherein in the layer model 3D visualization step, when one layer in the layer model is selected, nodes included in the layer are visualized.

12. A method for designing machine learning model using a 3D user interface, the method comprising:

a layer input step of inputting a type of a layer and parameters of the layer using a layer input panel including a layer type determination panel and a layer parameter input panel;

a layer model configuration step of receiving the type and parameters of the layer selected in the layer input step, constructing a layer model using the input layers and displaying a configuration of the layer model on a layer state display panel of a layer state panel;

a layer model process step of parsing the layer model displayed on the layer state display panel of the layer state panel to calculate a layer position and node position for visualization; and a layer model 3D visualization step of visualizing the layer model calculated in the layer model process step in 3D, wherein in the layer model 3D visualization step, when defining the shape of the layer as (ny, nz, ch), the layer included in the layer model is represented as ch square units (L) having a height of the ny value and a width of the nz value, and wherein in the layer model 3D visualization step, when the layer model includes an add-skip connectional layer, at least one layer representing a parallel layer relationship in the layer model is visualized as a combination of new layers moved in parallel in the direction in which the layer model progresses.

\* \* \* \* \*